United States Patent
Lane et al.

(10) Patent No.: US 10,731,964 B2
(45) Date of Patent: Aug. 4, 2020

(54) PHOTONIC IMAGING ARRAY

(71) Applicant: The Charles Stark Draper Laboratory, Inc., Cambridge, MA (US)

(72) Inventors: Benjamin F. Lane, Sherborn, MA (US); Steven J. Spector, Lexington, MA (US); Alan X. Zhou, Cambridge, MA (US); Julian A. Brown, Cambridge, MA (US); Michael G. Moebius, Allston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 211 days.

(21) Appl. No.: 15/803,392

(22) Filed: Nov. 3, 2017

(65) Prior Publication Data

US 2018/0120085 A1    May 3, 2018

Related U.S. Application Data

(60) Provisional application No. 62/417,098, filed on Nov. 3, 2016.

(51) Int. Cl.
| | | |
|---|---|---|
| *G01B 9/02* | (2006.01) | |
| *G02B 6/32* | (2006.01) | |
| *G02B 6/12* | (2006.01) | |
| *G02B 6/124* | (2006.01) | |
| *G01S 3/786* | (2006.01) | |
| *G02B 6/125* | (2006.01) | |
| *G02B 6/28* | (2006.01) | |

(52) U.S. Cl.
CPC ........ *G01B 9/02027* (2013.01); *G01S 3/7867* (2013.01); *G02B 6/12002* (2013.01); *G02B 6/124* (2013.01); *G02B 6/125* (2013.01); *G02B 6/32* (2013.01); *G02B 6/12011* (2013.01); *G02B 6/2813* (2013.01); *G02B 6/2861* (2013.01)

(58) Field of Classification Search
CPC ............ G02B 6/12002; G02B 6/12011; G02B 6/2813; G02B 6/2861; G01S 3/7867
See application file for complete search history.

(56) References Cited

U.S. PATENT DOCUMENTS

| | | |
|---|---|---|
| 5,812,088 A | 9/1998 | Pi et al. |
| 6,421,163 B1 * | 7/2002 | Culver ................... G02B 27/46 359/237 |

(Continued)

FOREIGN PATENT DOCUMENTS

DE         19536575         4/1997

OTHER PUBLICATIONS

Greenwood, "Understanding Passive Beamforming Networks," Defense Electronics, 5 pages, Sep. 6, 2011.

(Continued)

*Primary Examiner* — Michael A Lyons
(74) *Attorney, Agent, or Firm* — Sunstein LLP (57) ABSTRACT

A multi-beam optical phased array on a single planar waveguide layer or a small number of planar waveguide layers enables building an optical sensor that performs much like a significantly larger telescope. Imaging systems use planar waveguides created using micro-lithographic techniques. These imagers are variants of "phased arrays," common and familiar from microwave radar applications. However, there are significant differences when these same concepts are applied to visible and infrared light.

5 Claims, 8 Drawing Sheets

(56) References Cited

U.S. PATENT DOCUMENTS

| | | | |
|---|---|---|---|
| 2004/0156591 A1 | 8/2004 | Zheng et al. | |
| 2006/0210279 A1* | 9/2006 | Hillis | H04B 10/1121 398/118 |
| 2009/0160576 A1 | 6/2009 | Dent | |
| 2009/0272880 A1* | 11/2009 | Stanton | H01L 27/14621 250/208.1 |
| 2010/0225539 A1 | 9/2010 | Margomenos et al. | |
| 2015/0233762 A1* | 8/2015 | Goldring | G01N 21/255 356/451 |
| 2015/0378241 A1* | 12/2015 | Eldada | G01S 7/4817 359/15 |
| 2016/0245895 A1* | 8/2016 | Lane | G02B 6/12011 |
| 2017/0357055 A1* | 12/2017 | Spector | G02B 6/293 |

OTHER PUBLICATIONS

Microwaves101, "Butler Matrix," https://www.microwaves101.com/encyclopedias/butler-matrix, 4 pages, Apr. 7, 2015.

Zmuidzinas, "Cramer-Rao Sensitivity Limits for Astronomical Interferometry," Optical Society of America, 37 pages, 2002.

Zmuidzinas, "Cramer-Rao sensitivity limits for astronomical instruments: implications for interferometer design," J. Opt. Soc. Am. A., vol. 20, No. 2, pp. 218-233, Feb. 2003.

ISA, Israel Patent Office, International Search Report and Written Opinion, International Application No. PCT/US2017/059976, 10 pages, dated Mar. 1, 2018.

\* cited by examiner (Prior Art)
Fig. 1

PHOTONIC IMAGING ARRAY

CROSS-REFERENCE TO RELATED APPLICATIONS

This application claims the benefit of U.S. Provisional Patent Application No. 62/417,098, filed Nov. 3, 2016, titled "Photonic Imaging Array," the entire contents of which are hereby incorporated by reference herein, for all purposes. The entire contents of U.S. Pat. Publ. No. 2016/0245895, titled "Zero Optical Path Difference Phased Array," by Benjamin F. Lane and Steven J. Spector, filed Feb. 24, 2016 and published Aug. 25, 2016, is hereby incorporated by reference herein, for all purposes.

TECHNICAL FIELD

The present invention relates to photonic planar imaging systems and, more particularly, to such imaging systems containing Butler matrices or other structures that provide analog equivalents to Fast Fourier Transformers of optical signals.

BACKGROUND ART

Most artificial satellites, spacecraft and other propelled devices, such as aircraft, ship and ground vehicles (collectively referred to herein as vehicles), require information about their locations and/or attitudes to accomplish their missions. This information may be obtained from one or more sources, such as an inertial navigation system (INS), a global positioning system (GPS), ground-based radar tracking stations and/or an on-board star tracker.

A star tracker is an optical device that measures bearing(s) to one or more stars, as viewed from a vehicle. A star tracker typically includes a star catalog that lists bright navigational stars and information about their locations in the sky, sufficient for a processor to calculate a location of a vehicle in space, given bearings to several of the stars. A conventional star tracker includes a lens that projects an image of a star onto a photocell, or that projects an image of one or more stars onto a light-sensitive sensor array (digital camera).

One type of star tracker is "strapped-down," meaning its view angle, relative to its vehicle, is fixed. Another type of star tracker can be aimed mechanically, such as in a direction in which a navigational star is expected to be seen. Using data from the photocell or sensor array, the star catalog and information about the star tracker's view angle, relative to the vehicle, a processor in the star tracker calculates a position of the vehicle in space.

Strapped-down star trackers are mechanically simpler than mechanically aimable star trackers. However, the fixed view angle of a strapped-down star tracker limits the number of navigational stars that may be used. Mechanically aimable start trackers can use a larger number of navigational stars. However, aiming a prior art star tracker, relative to its vehicle, with the required precision poses substantial problems. In either case, preventing stray light, such as from the sun or reflected from the moon, reaching the photocell or sensor array is challenging, particularly when a navigational star of interest is apparently close to one of these very bright objects.

Conventional strapped-down and mechanically aimable star trackers are large, heavy and consume a large amount of energy. For example, a large lens is massive, and its focal length distance between the lens and sensor contribute to the volume occupied by a star tracker. Smaller and lighter star trackers are desirable.

A Butler matrix (first described by Jesse Butler and Ralph Lowe in "Beam-Forming Matrix Simplifies Design of Electronically Scanned Antennas," Electronic Design, volume 9, pp. 170-173, Apr. 12, 1961, the entire contents of which are hereby incorporated by reference herein for all purposes) is a type of passive phasing network having N inputs and N outputs, usually a power of two. A Butler matrix, coupled between a set of antenna elements and a transmitter or a receiver, may be used for beamforming.

The N inputs of a Butler matrix are isolated from each other. Phases of the N outputs are linear, with respect to position, so the beam is tilted off the main axis. None of the inputs provides a broadside beam. The phase increments, among the outputs, depend on which input is used. For example, a Butler matrix may be constructed such that when input port 1 is used, the four outputs are linearly phased in 45 degree increments; when input port 2 is used, the four outputs are linearly phased in 135 degree increments; when input port 3 is used, the four outputs are linearly phased in 270 degree increments; and when input port 4 is used, the four outputs are linearly phased in 315 degree increments. Thus, depending on which of the N inputs is accessed, the antenna beam is steered in a specific direction in one plane. Two Butler matrices can be combined to facilitate 3-dimensional scanning.

SUMMARY OF EMBODIMENTS

An embodiment of the present invention provides an imaging system having a design wavelength between about 100 nm and about 1 mm and a design bandwidth. The imaging system includes a wafer and a plurality of optical couplers disposed in a predefined planar array on a first layer of the wafer. A plurality of optical detectors is disposed in a predefined planar array on a second layer of the wafer. The second layer is different (distinct) from the first layer. The imaging system also includes a first optical phasing network. The first optical phasing network has inputs and outputs. The inputs of the first optical phasing network are respectively optically coupled to the plurality of optical couplers. The imaging system also includes a second optical phasing network. The second optical phasing network has inputs and outputs. The inputs of the second optical phasing network are respectively optically coupled to the outputs of the first optical phasing network. The outputs of the second optical phasing network are respectively optically coupled to the plurality of optical detectors. The first and second optical phasing networks cooperate to form an analog 2-dimensional optical Fourier transformer.

The plurality of optical couplers may be organized as a plurality of rows of optical couplers and a plurality of columns of optical couplers. The first optical phasing network may include a first plurality of optical phasing networks. Each optical phasing network of the first plurality of optical phasing networks may have a respective plurality of inputs and a respective plurality of outputs. Each row of optical couplers may be optically coupled to the plurality of inputs of a distinct optical phasing network of the first plurality of optical phasing networks. The second optical phasing network may include a second plurality of optical phasing networks. Each optical phasing network of the second plurality of optical phasing networks may have a respective plurality of inputs and a respective plurality of outputs. For each optical phasing network of the first plurality of optical phasing networks, each output of the optical phasing network may be optically coupled to an input of a distinct optical phasing network of the second plurality of optical phasing networks.

Each optical phasing network of the first plurality of optical phasing networks may include a respective Butler matrix. Each optical phasing network of the second plurality of optical phasing networks may include a respective Butler matrix.

The first optical phasing network may be disposed on a third layer of the wafer. The third layer may be different (distinct) from the first layer and different (distinct) from the second layer of the wafer. The second optical phasing network may be disposed on a fourth layer, different (distinct) from the third layer, of the wafer.

The first optical phasing network may include a first plurality of stages of optical combination. The first optical phasing network may be distributed across a first plurality of layers of the wafer, one stage of the first plurality of stages of optical combination per layer of the first plurality of layers. The second optical phasing network may include a second plurality of stages of optical combination. The second optical phasing network may be distributed across a second plurality of layers, different from the first plurality of layers, of the wafer, one stage of the second plurality of stages of optical combination per layer of the second plurality of layers.

Another embodiment of the present invention provides an imaging system having a design wavelength between about 100 nm and about 1 mm and a design bandwidth. The imaging system includes a wafer and a plurality of optical couplers disposed in a predefined planar array on the wafer. Each optical coupler has an output. Each optical coupler is configured to couple an optical signal from free space to its respective output. A plurality of optical combiners is disposed in a first plane on the wafer. The first plane is parallel to the planar array of the plurality of optical couplers. Each optical combiner has a plurality of inputs and a plurality of outputs. All the optical combiners need not have equal numbers of inputs or equal numbers of outputs. The number of inputs of any given optical combiner need not equal the number of outputs of the optical combiner.

A plurality of optical detectors is disposed in a second plane on the wafer. The second plane is parallel to the planar array of the plurality of optical couplers. Each optical detector has an input. A plurality of optical waveguides is disposed in a third plane on the wafer. The third plane is parallel to the planar array of the plurality of optical couplers.

The outputs of the plurality of optical couplers are coupled to the inputs of the plurality of optical detectors. The outputs of the plurality of optical couplers are coupled in a hierarchical arrangement by the plurality of optical combiners and groups of the plurality of optical waveguides. The outputs of the plurality of optical couplers are coupled to the inputs of the plurality of optical detectors such that optical lengths of the optical waveguides in each group of optical waveguides are equal, within one coherence length at a bandwidth greater than about 0.1% plus a spacing between two maximally spaced-apart optical couplers of the plurality of optical couplers.

Each optical combiner of the plurality of optical combiners may include a multi-modal interferometer (MI II). The hierarchical arrangement may include an H-tree.

BRIEF DESCRIPTION OF THE SEVERAL VIEWS OF THE DRAWING

The invention will be more fully understood by referring to the following Detailed Description of Specific Embodiments in conjunction with the Drawings, of which.

DETAILED DESCRIPTION OF SPECIFIC EMBODIMENTS

The present application discloses imaging systems that use planar waveguides created using micro-lithographic techniques. These imagers are variants of "phased arrays," common and familiar from microwave radar applications. However, there are significant differences when these same concepts are applied to visible and infrared light. First, we seek to develop a passive, wideband imaging array suitable for collecting incoherent radiation, in contrast to most radars, which use very narrowband coherent radiation. Second, sensitivity requirements are such that the antennas created for these applications must be very large, compared to the wavelength of radiation. Whereas a typical radar antenna might be 100 lambdas (wavelengths) in diameter, a chipscale star tracker might be 1,000 to 10,000 lambdas in size. As a result, the amount of information, defined as "modes," given by $\sim(d/\lambda)2$, is very large. See, for example, Equation 26 in Jonas Zmuidzinas, "Cramér-Rao sensitivity limits for astronomical instruments: implications for interferometer design," J. Opt. Soc. Am. A, Vol. 20, No. 2, pp. 218-233, February, 2003, the entire contents of which are hereby incorporated by reference herein, for all purposes. This has implications for how the imager is designed. Given realistic constraints in available detectors, it may not always be feasible to collect and process all of these modes of information, and thus good imager design becomes a question of choosing which modes to discard, without sacrificing essential functionality. In addition, limitations imposed by micro-lithographic techniques, chiefly a limitation in the number of layers that can be put down on a substrate, create challenges in designing an imager.

Butler Matrix

Figure 1:
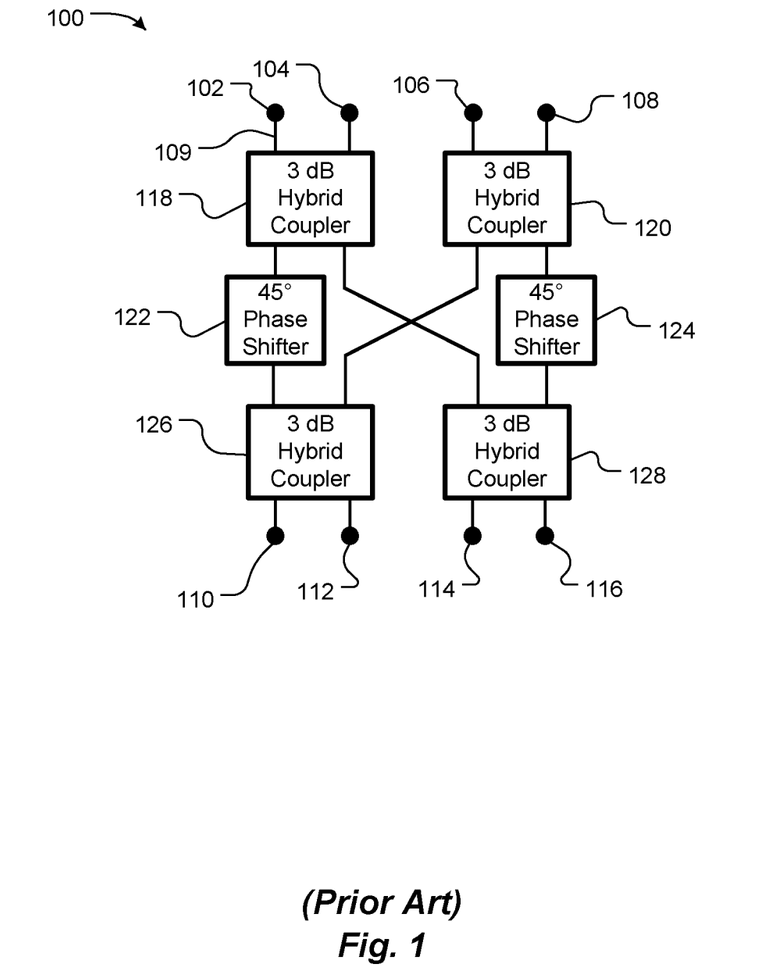
FIG. 1 is a schematic block diagram of a 4-element Butler matrix, according to the prior art.

A Butler matrix is well known from microwave technology. In effect, a Butler matrix corresponds to a Fast Fourier Transform (FFT) implemented using analog waveguide technology. FIG. 1 is a schematic block diagram of an exemplary 4-element Butler matrix 100, according to the prior art. The Butler matrix 100 includes four inputs 102, 104, 106 and 108 and four outputs 110, 112, 114 and 116. The inputs 102-108 are coupled via waveguides, represented by waveguide 109, two hybrid couplers 118 and 120, two phase shifters 122 and 124 and two additional hybrid couplers 126 and 128 to the four outputs 110-116, as shown. Each input 102-108 may, for example, be connected to a respective optical coupler (not shown) to couple light from the environment into the Butler matrix 100. This arrangement is scalable to 2n elements, analogous to a Fast Fourier Transform algorithm. The optical couplers may be arranged in an array, such as a rectangular N×1 array.

Imager Using Layered Butler Matrices

Figure 2:
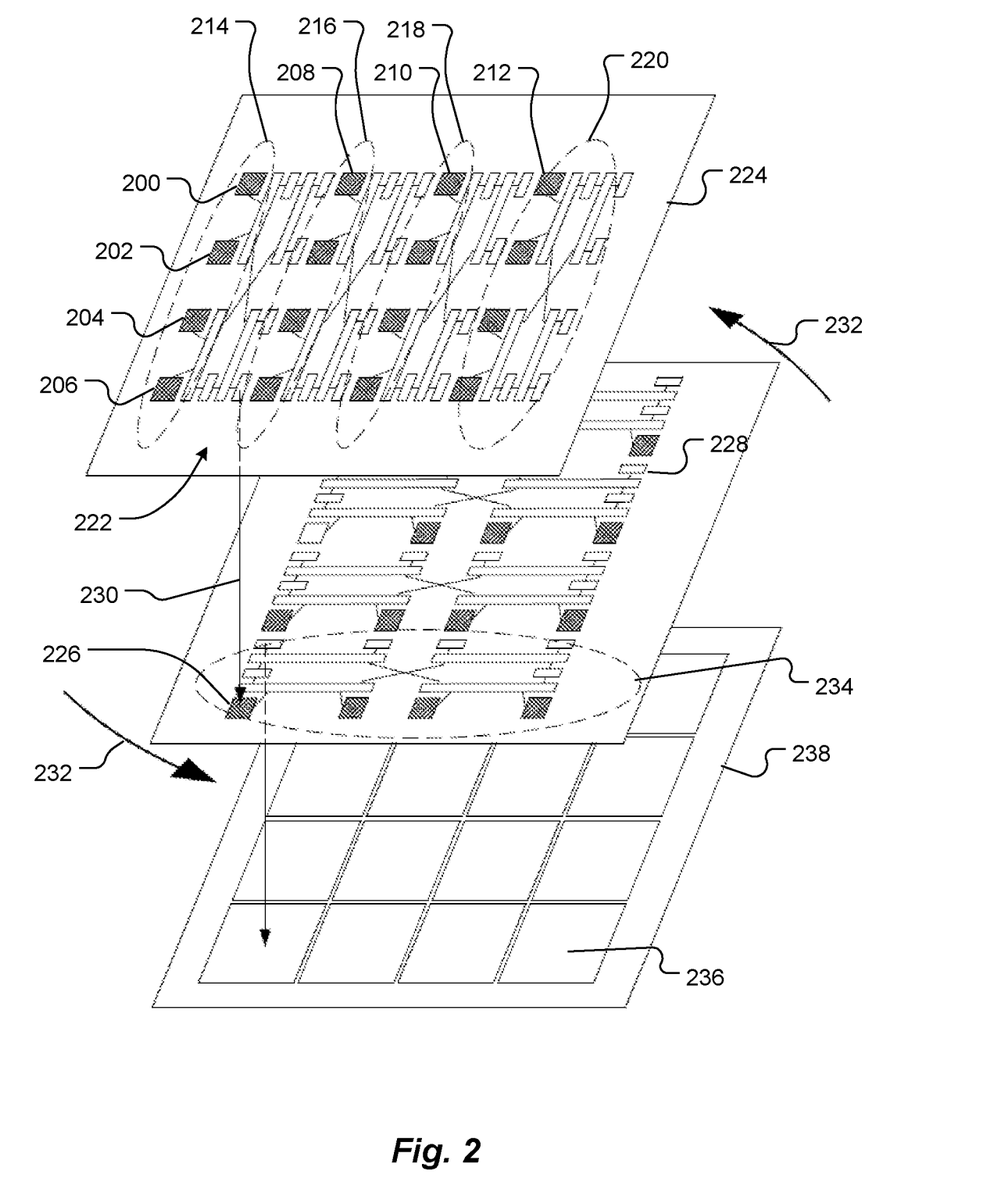
FIG. 2 is a schematic illustration of an imaging system that includes a 2-dimensional Butler matrix implemented as a series of 1-dimensional Butler matrices implemented across two photonic layers, according to an embodiment of the present invention.

As shown schematically in FIG. 2, optical couplers (collectors), exemplified by optical couplers 200, 202, 204, 206, 208, 210 and 212, may be arranged in an N×N array in rows and columns, exemplified by columns 214, 216 and 218. Each row or column 214-218 of collectors 200-212, for example collectors 200-206 in column 214, leads to a respective N×1 Butler matrix, exemplified by Butler matrix 220. The light collected by the collectors 200-212 is interleaved, phase shifted and combined following standard Butler matrix methodology, as discussed with respect to FIG. 1. In the arrangement shown in FIG. 2, first, the collectors, such as collectors 200-206, in each column, such as column 214, are combined in a respective Butler matrix, such as Butler matrix 222, in a top layer 224. Light is then transferred from the top layer 224 to inputs, exemplified by input 226, on a second layer 228 below the top layer 224, for example as indicated by an arrow 230 (the output from the Butler matrix 222 in the top layer 224 should register above the input 226 in the second layer 228), where the rows are combined in a similar series of (now rotated, relative to the top layer 224, as indicated by arrows 232) 1-dimensional Butler matrices, exemplified by Butler matrix 234. At the end, the output is an N×N grid of "processed" outputs which may, for example, be fed to an array 236 of optical detectors on a third layer 238. In effect, N×1-dimensional FFTs have been performed.

A drawback to this method is the large number of components that need to be fit together on each layer 224, 228 and 238, limiting the pixel density. In a variation of the method, shown schematically in FIG. 3, each stage of combination (there are log 2(N) such stages) is implemented in a separate layer, below the top layer of collectors. Light from each pair of collectors, exemplified by collectors 300 and 302, and 304 and 306, is combined by a respective combiner and phase shifters and coupled to the next lower layer 312 by components, collectively exemplified by components 308 and 310, respectively, on a top layer 314. This allows the components of the Butler matrices to be spread across more layers 312-314, and greater pixel density can be achieved. Similarly, the components of the second layer 228 (FIG. 2) are distributed across two additional layers 316 and 318. As in FIG. 2, the components of layers 316 and 318 are orientation 90° from the orientation of the components in the top layers 312-314. In either configuration (FIG. 2 or FIG. 3), the result after passing through both sets of Butler matrices is a 2-dimensional FFT's image, output as an N×N grid of taps at the bottom of the layered structure. This entire structure is then placed on top of a pixelated imager, such as a common CCD or CMOS imager 236.

Collectors May be Fed Using Microlenses

Figure 3:
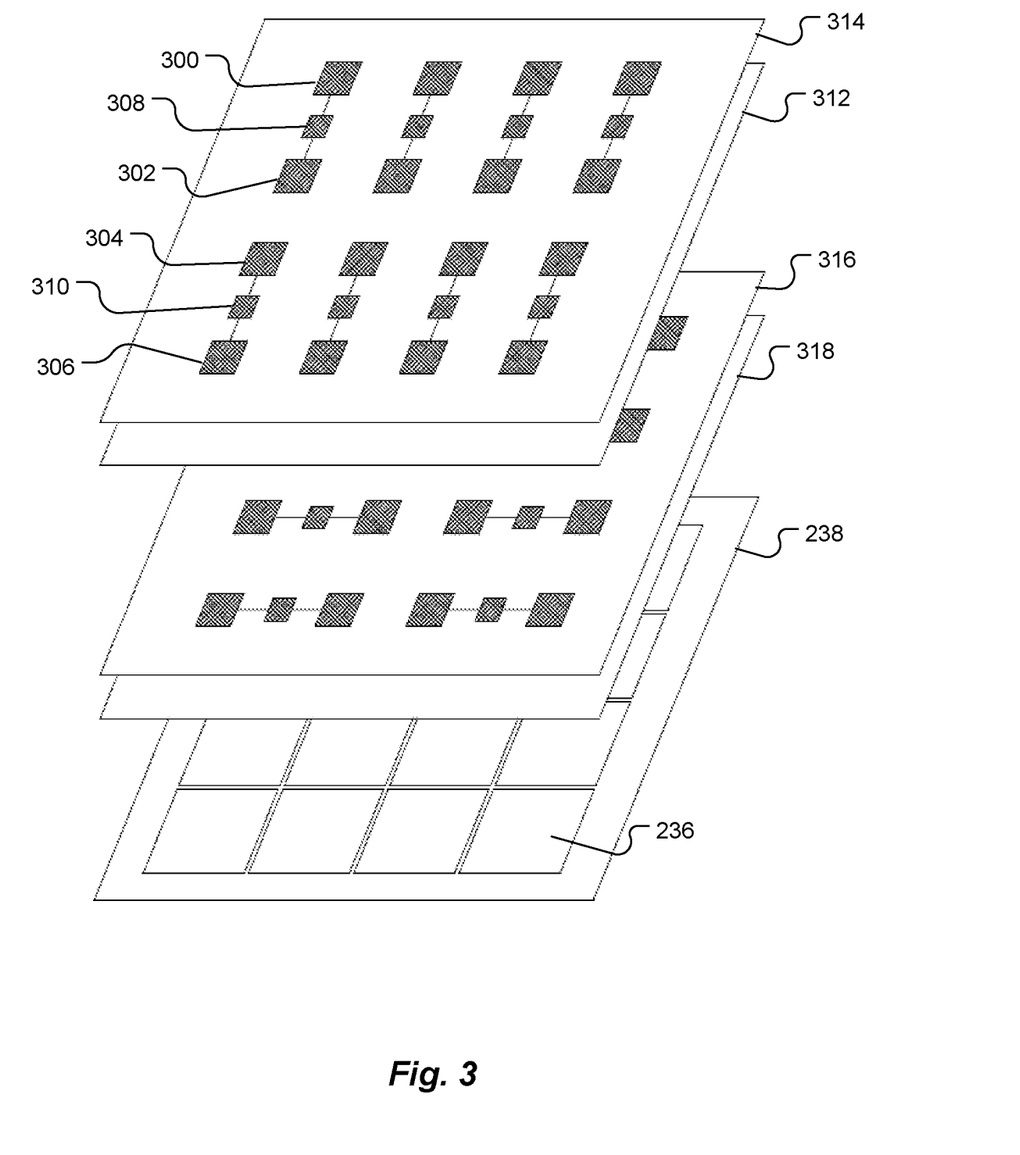
FIG. 3 is a schematic illustration of an imaging system that includes a 2-dimensional Butler matrix implemented as a series of 1-dimensional Butler matrices implemented across a series of photonic layers, according to an embodiment of the present invention.

Any embodiment may include an array of microlenses (not shown) disposed above the collectors 200-212 or 300-306, one microlens per collector, to increase the effective light capture area of each collector 200-212 or 300-306. Each microlens is larger in area than its corresponding collector 200-212 or 300-306. However, the microlenses need not focus images onto the collectors 200-212 or 300-306. Instead, the microlenses need only concentrate light from their respective capture areas onto their respective collectors 200-212 or 300-306.

"Fat H-Tree" Imager

Figure 4:
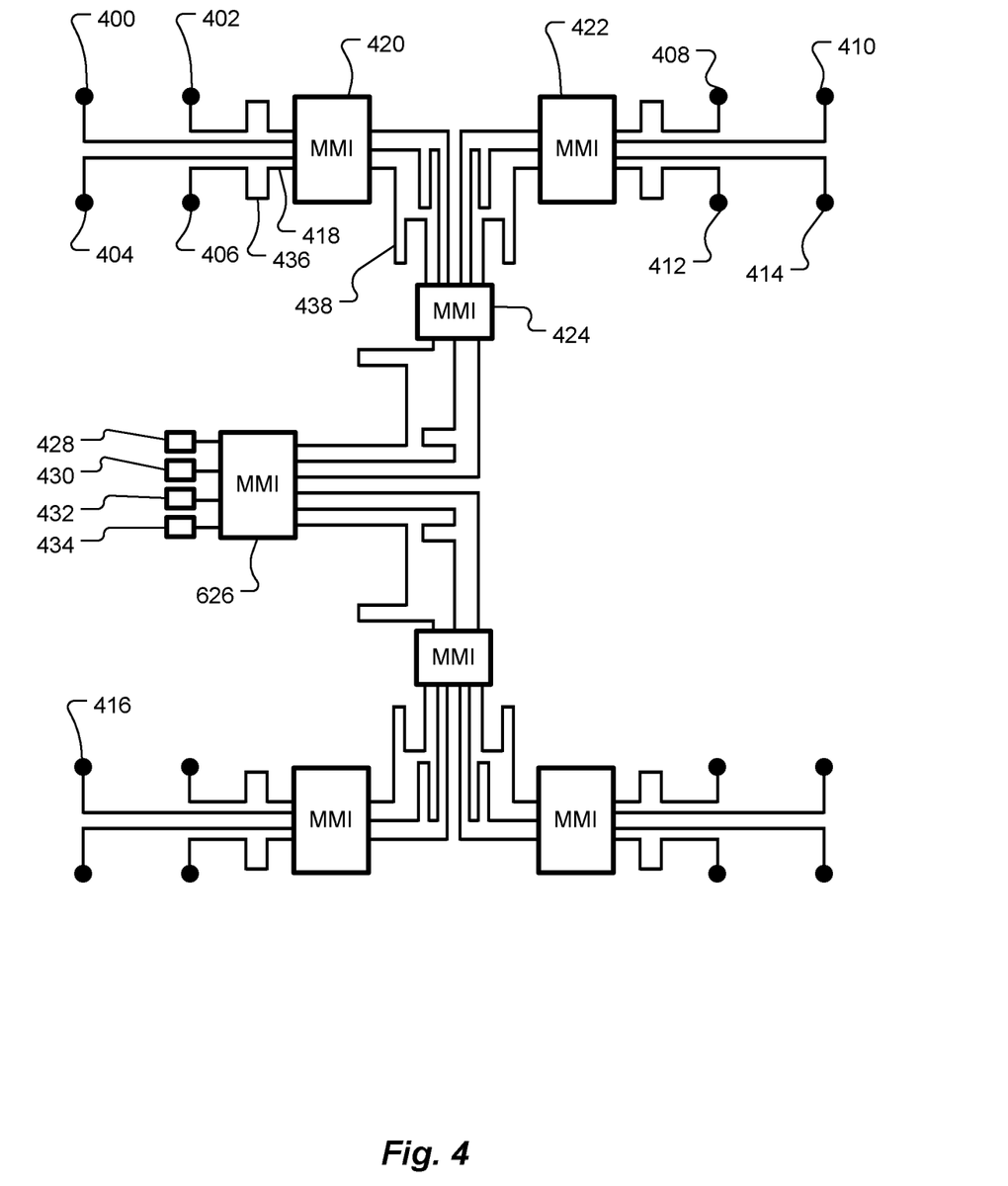
FIG. 4 is a schematic block diagram of a "fat H-tree" imager, according to an embodiment of the present invention.
Figure 5:
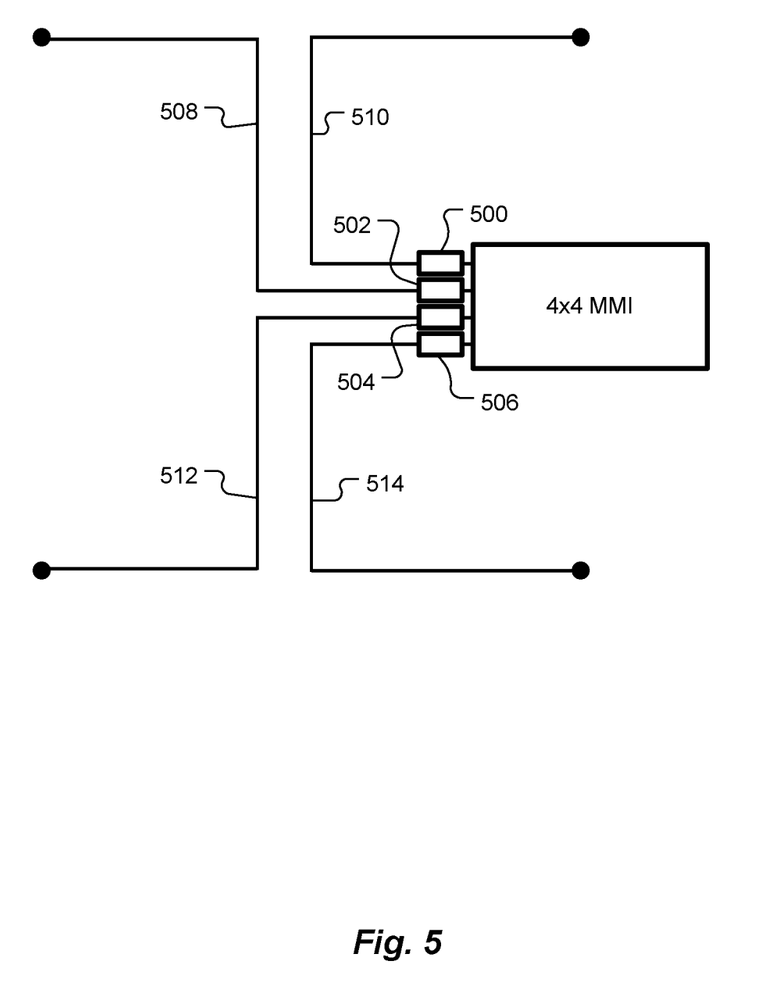
FIG. 5 is a schematic block diagram of a portion of a fat H-tree, similar to the fat H-tree of FIG. 4, but according to another embodiment of the present invention.

The embodiments discussed with respect to FIGS. 2 and 3 are straightforward and work. However, they may be either limited in pixel density or require 2*log 2(N) separate layers of waveguides and associated layer crossovers. An alternative embodiment may be implemented using a single layer and is related to the "Zero Optical Path Difference" (ZOPD) layout described in U.S. patent application Ser. No. 15/051, 875 (published as US 2016/0245895). However, the ZOPD layout, as described in the above-referenced patent application, creates only a single combined output. Acting as an antenna, the ZOPD system responds to incoming light from only a single direction of incidence. In antenna parlance, the ZOPD system only has a single main lobe. As an imager, the ZOPD system has only a single "pixel." FIG. 4 is a schematic block diagram of a "fat H-tree" imager, according to an embodiment of the present invention. A fat H-tree imager replaces the single output tap of the ZOPD system with a plurality of outputs and, therefore, the device can be used to create an image, i.e., the resulting system simultaneously measures the intensity of light incident from many different directions. Effectively, the system has many "pixels."

Light from input vertical couplers, exemplified by couplers 400, 402, 404, 406, 408, 410, 412, 414 and 416, is combined in stages using waveguides, exemplified by waveguide 418. For example, first pairwise, then in groups of four, then in groups of 16 and so forth. In FIG. 4, the first stage combines four vertical couplers 400-406, 408-414, etc. Each combination may be performed using a multi-modal interferometer (MMI), exemplified by MMIs 420, 422 and 424, a photonic structure common in this field. Such an MMI combines light from N inputs to generate M outputs; N and M may be the same or different, as will be discussed below. The exact relationship between the phase and amplitude of the inputs and outputs depends on the dimensions of the MMI. Versions have been built that act as 3 dB hybrids, 180-deg hybrids and so on. Outputs of the final MMI 426 are fed to optical detectors, exemplified by optical detectors 428, 430, 432 and 434.

Some or all of the waveguides, for example waveguide 418, may meander, as indicated at 436 and 438, as needed to make the waveguides' optical lengths equal to optical lengths of waveguides from other vertical couplers and between pairs of MMIs 420-424. Lengths of some waveguides are exaggerated in the drawings for clarity.

FIGS. 5-8 are schematic block diagrams of exemplary portions of fat H-trees, according to other embodiments. For example, in FIG. 5, phase shifters, exemplified by phase shifters 500, 502, 504 and 506, are used to equalize optical lengths of the optical waveguides 508, 510, 512 and 514, rather than meanders 436 and 438, as shown in FIG. 4. The optical circuit shown in FIG. 5 may, for example, be used in each of the first two levels of the fat H-tree.

Figure 6:
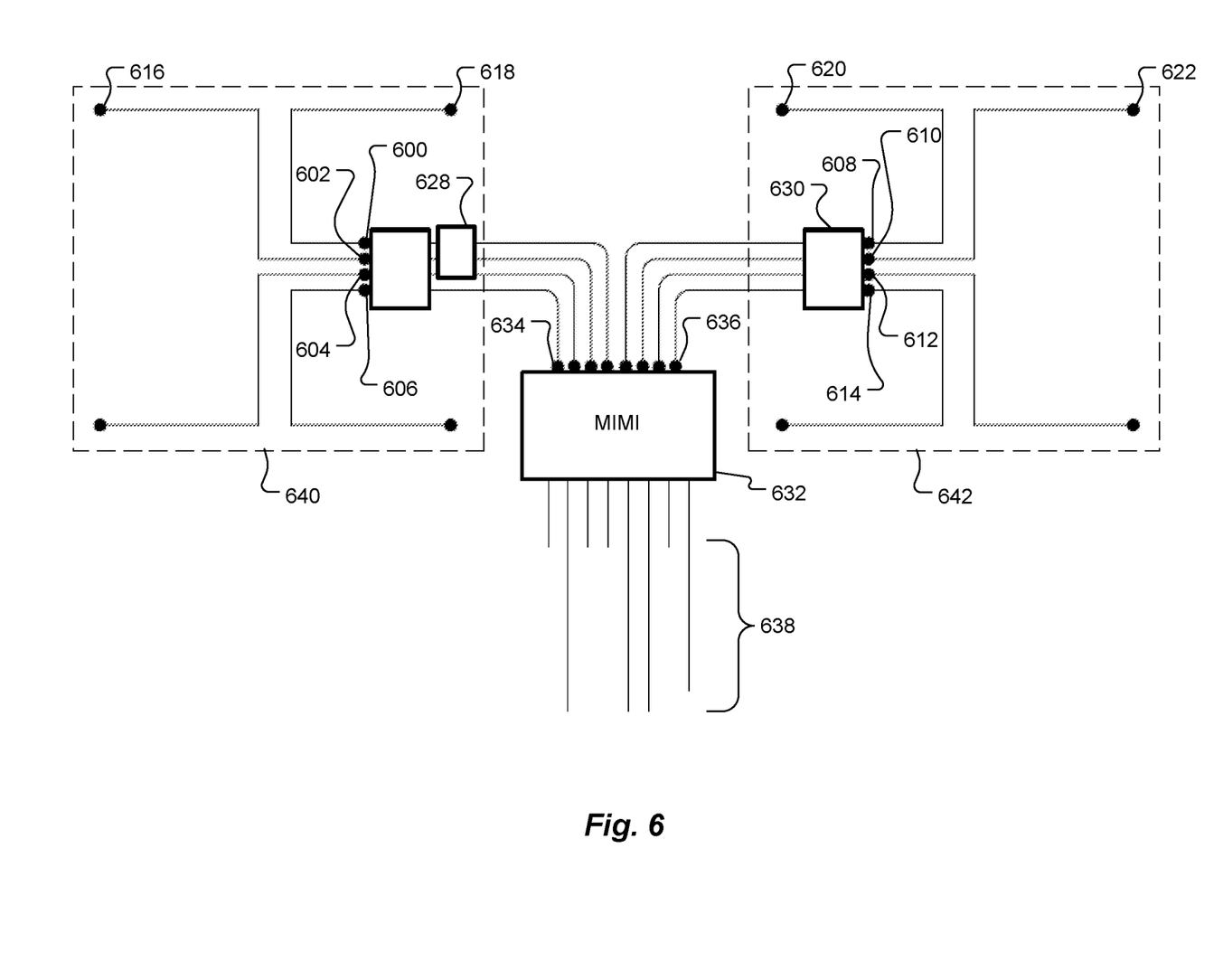
FIGS. 6-8 are schematic block diagrams of exemplary portions of fat H-trees, according to embodiments of the present invention.

FIG. 6 shows an exemplary portion of the first two levels of the fat H-tree, according to an embodiment. As in FIG. 5, phase shifters 600, 602, 604, 606, 608, 610, 612 and 614 are used to equalize optical lengths of the optical waveguides between couplers, such as couplers 616, 618, 620 and 622, and respective MMIs 628 and 630 at the first level. Outputs from the first level MMIs 628 and 630 are fed to respective inputs to a second level MMI 632 via respective phase shifters, exemplified by phase shifters 634 and 636, to equalize optical lengths of the respective optical waveguides. The second level MMI 632 may be an 8×8 MMI, but only four of its outputs 638 may continue to the next level.

Figure 7:
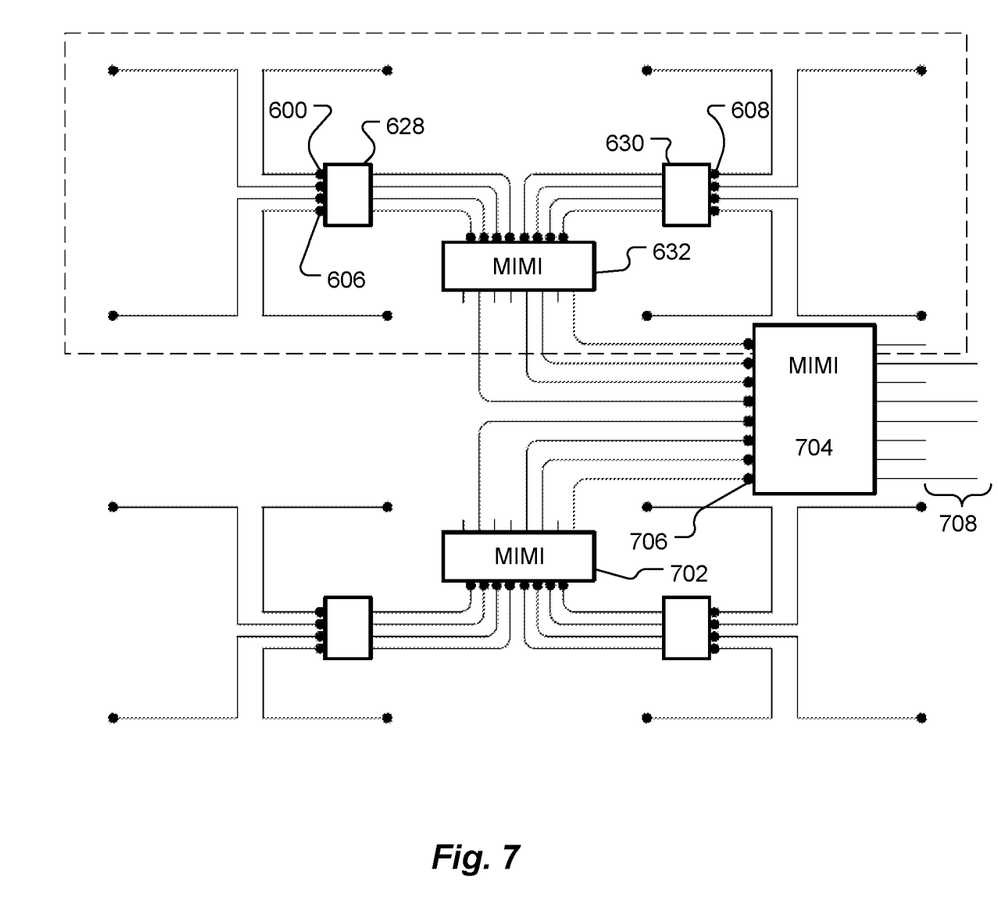

FIG. 7 shows an exemplary portion of the first three levels of the fat H-tree, according to an embodiment. As in FIG. 6, waveguides between second level MMIs 632 and 702 and a third level MMI 704 include respective phase shifters, exemplified by phase shifter 706, to equalize optical lengths of the respective optical waveguides, and only four outputs from the third level MMI 704 continue to the next level, as indicated at 708.

Figure 8:
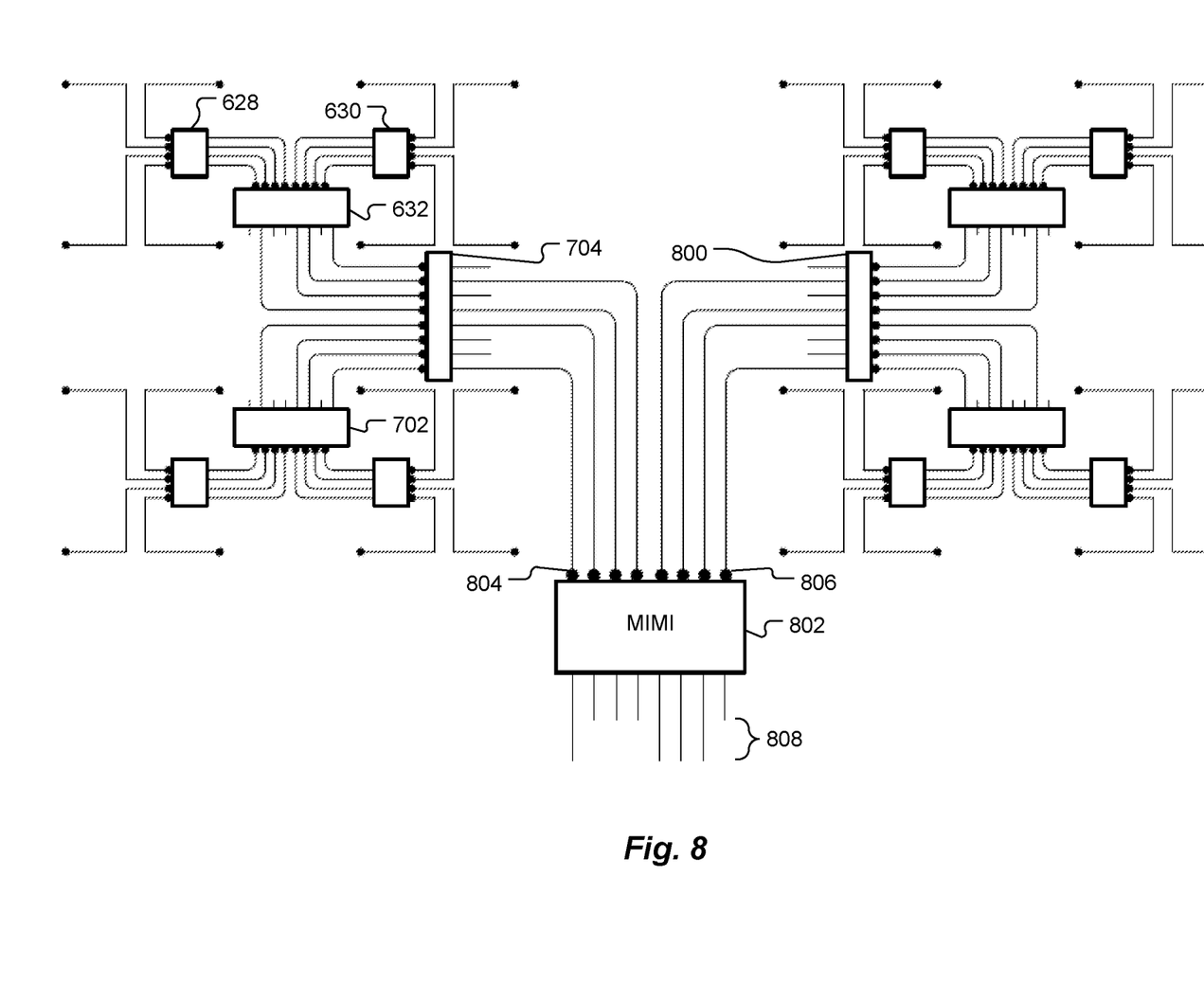

FIG. 8 shows exemplary portions of the first four levels of the fat H-tree, according to an embodiment. As in FIGS. 6 and 7, waveguides between third level MMIs 704 and 800 and a fourth level MMI 802 include respective phase shifters, exemplified by phase shifters 804 and 806, to equalize optical lengths of the respective optical waveguides, and only four outputs from the fourth level MMI 802 continue to the next level, as indicated at 808.

The layouts discussed herein can be implemented to preserve overall path-lengths, i.e., to maintain near-zero optical path length differences among the optical paths, i.e., within the coherence length of the light (as described in the ZOPD patent application), which is crucial for operating with incoherent broadband radiation such as starlight, as discussed in the above-referenced patent application. For example, some waveguides may include "meanders," as discussed with respect to FIG. 4, to increase their optical length, so as to match the optical lengths of other waveguides. It should be noted here that typical MMI structures do not work over wide bandpasses, i.e., their responses tend to vary rapidly with wavelength. However, there are a number of known techniques that have been demonstrated to compensate for this effect, e.g., by patterning subwavelength structures into the MMI (sides or top).

It is possible that the MMIs or the large number of waveguides could take up more space than is available between elements. To overcome this problem, it is possible to shift the spacings between groups, such as groups 640 and 642 (FIG. 6), to place them further apart, thus making room for more waveguides between the groups 640 and 642. Ideally, the input couplers are arranged in an evenly spaced grid. Such even spacing makes it possible to use commercially available microlens arrays to feed the input couplers. Such microlenses are usually regularly spaced. Thus, one would shift the input couplers (collectors) one "tick" over, leaving (partial or complete) rows or columns empty. The resulting gaps in the input array create real, but acceptably small, artifacts in the resulting image, similar to diffraction "spiders" seen in images taken with large telescopes.

Detectors are placed at the end of the final MMI, as discussed with reference to FIG. 4, either directly in the MMI or by connecting waveguides to the detectors. Reconstruction can be done by a processor or other circuit by accurately modeling the performance of the waveguides and MMIs and reversing the input/output relationship. Realistically, fabrication errors will, in many cases, make this modeled performance differ from the actual performance. However, phase shifters can be used to correct for the errors. Another possibility is to correct for the errors during the reconstruction. The errors can be determined experimentally by imaging a series of test images.

Reducing Complexity

In the above methods, N×N inputs give N×N outputs. While this means there can be no loss in information, it may be difficult to fit the large number of waveguides in the spaces between the input couplers. To reduce complexity, the number of outputs can be reduced. For example, the Butler matrix can be thinned by passing only a select subset of outputs to carry forward to the next stage, for example as discussed with reference to FIG. 6. This approach effectively sacrifices "pixels" and hence field of view.

In other embodiments, the loss of field of view can be avoided, while still reducing the number of outputs. Using concepts of compressive sensing (ref. Candes), the data in the image is sampled in a more efficient manner than standard imaging. For example, image a scene that could be expressed as N pixels. However, this scene is "sparse," in the sense that there are only K pixels that are non-zero (K-sparse). Compressive sensing proves that it is possible to fully recover these K pixels using K log 2(N) measurements, provided that they are sampled in the proper way. One such example would be to collect K log 2(N) randomly chosen samples in a measurement basis that is "incoherent" with the original basis (in which the inputs are "sparse").

A compressive sampler can be constructed by making each of the combiners, shown above, in an appropriate way, e.g. by scrambling "randomly." The fat H-tree approach, together with random phase errors (either inherent in the fabrication or added intentional) can provide such scrambling. The scrambling should not, however, be without some reason. The resulting measurement matrix must exhibit the "restricted isometry property," as outlined in numerous compressive sensing papers.

As used herein, "optical coupler" means an optical antenna or other interface device between optical signals traveling in free space and optical signals traveling in a waveguide, such as an optical fiber or solid glass. Exemplary optical couplers include collectors 200-212 discussed with reference to FIG. 2. In embodiments where optical waveguides extend perpendicular to a desired direction of free-space propagation, an optical coupler should facilitate this change of direction. Examples of optical couplers include compact gratings, prisms fabricated in waveguides and facets etched in wafers and used as mirrors. An "optical antenna" is a device designed to efficiently convert free-propagating optical radiation to localized energy, and vice versa. Optical antennas are described by Palash Bharadwaj, et al., "Optical Antennas," Advances in Optics and Photonics 1.3 (2009), pp. 438-483, the entire contents of which are hereby incorporated by reference herein for all that it discloses.

In some embodiments, the imaging system may be implemented on a photonic chip, such as a silicon wafer. "Wafer" means a manufactured substrate, such as a silicon wafer. The surface of the earth, for example, does not fall within the meaning of wafer. The photonic chip provides a substrate, and the photonic chip may be fabricated to provide optical waveguides within a thickness of the substrate. The optical waveguides may be made of glass or another material that is optically transparent at wavelengths of interest. The optical waveguides may be solid or they may be hollow, such as a hollow defined by a bore in the thickness of the substrate, and partially evacuated or filled with gas, such as air or dry nitrogen. The optical waveguides may be defined by a difference between a refractive index of the optical medium of the waveguides and a refractive index of the substrate or other material surrounding the optical waveguides. The photonic chip may be fabricated using conventional semiconductor fabrication processes, such as the conventional CMOS process.

As used herein, "light" means electromagnetic radiation having a wavelength between about 100 nm and about 1 mm. As used herein, an "imaging system" has a design wavelength between about 100 nm and about 1 mm and a design bandwidth.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

As used herein, including in the claims, "on" and "in," used in connection with a wafer, mean disposed on a surface of the wafer or disposed within the thickness of the wafer.

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. Processing of image signals, such as signal from the array 236 of optical detectors, may be performed by computer program instructions (such as software), hardware (such as combinatorial logic, Application Specific Integrated Circuits (ASICs), Field-Programmable Gate Arrays (FPGAs), processor or other hardware), firmware or combinations thereof.

Embodiments, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. An imaging system having a design wavelength between about 100 nm and about 1 mm and a design bandwidth, the imaging system comprising:
    a wafer;
    a plurality of optical couplers disposed in a predefined planar array on a first layer of the wafer;
    a plurality of optical detectors disposed in a predefined planar array on a second layer, different from the first layer, of the wafer;
    a first optical phasing network having inputs and outputs, the inputs of the first optical phasing network being optically coupled to the plurality of optical couplers; and
    a second optical phasing network having inputs and outputs, the inputs of the second optical phasing network being optically coupled to the outputs of the first optical phasing network and the outputs of the second optical phasing network being optically coupled to the plurality of optical detectors; wherein:
    the first and second optical phasing networks cooperate to form an analog 2-dimensional optical Fourier transformer.

2. An imaging system according to claim 1, wherein:
    the plurality of optical couplers is organized as a plurality of rows of optical couplers and a plurality of columns of optical couplers;
    the first optical phasing network comprises a first plurality of optical phasing networks, each optical phasing network of the first plurality of optical phasing networks having a respective plurality of inputs and a respective plurality of outputs;
    each row of optical couplers is optically coupled to the plurality of inputs of a distinct optical phasing network of the first plurality of optical phasing networks;
    the second optical phasing network comprises a second plurality of optical phasing networks, each optical phasing network of the second plurality of optical phasing networks having a respective plurality of inputs and a respective plurality of outputs;
    for each optical phasing network of the first plurality of optical phasing networks:
        each output of the optical phasing network is optically coupled to an input of a distinct optical phasing network of the second plurality of optical phasing networks.

3. An imaging system according to claim 2, wherein:
    each optical phasing network of the first plurality of optical phasing networks comprises a respective Butler matrix; and each optical phasing network of the second plurality of optical phasing networks comprises a respective Butler matrix.

4. An imaging system according to claim 2, wherein:

the first optical phasing network is disposed on a third layer of the wafer, different from the first layer of the wafer and different from the second layer of the wafer; and the second optical phasing network is disposed on a fourth layer, different from the third layer, of the wafer.

5. An imaging system according to claim 2, wherein:

the first optical phasing network comprises a first plurality of stages of optical combination;

the first optical phasing network is distributed across a first plurality of layers of the wafer, one stage of the first plurality of stages of optical combination per layer of the first plurality of layers;

the second optical phasing network comprises a second plurality of stages of optical combination;

the second optical phasing network is distributed across a second plurality of layers, different from the first plurality of layers, of the wafer, one stage of the second plurality of stages of optical combination per layer of the second plurality of layers.

* * * * *